United States Patent
Froehlich et al.

(10) Patent No.: US 8,573,026 B2
(45) Date of Patent: Nov. 5, 2013

(54) METHOD FOR ASCERTAINING VOLUME—OR MASS—FLOW OF A MEDIUM

(75) Inventors: Thomas Froehlich, Münchenstein (CH); Matthias Altendorf, Lörrach (DE); Torsten Strunz, London (GB)

(73) Assignee: Endress + Hauser Flowtec AG, Reinach (CH)

( * ) Notice: Subject to any disclaimer, the term of this patent is extended or adjusted under 35 U.S.C. 154(b) by 883 days.

(21) Appl. No.: 11/918,754

(22) PCT Filed: Apr. 20, 2006

(86) PCT No.: PCT/EP2006/061684
§ 371 (c)(1),
(2), (4) Date: Jan. 5, 2009

(87) PCT Pub. No.: WO2006/111552
PCT Pub. Date: Oct. 26, 2006

(65) Prior Publication Data
US 2009/0211330 A1    Aug. 27, 2009

(30) Foreign Application Priority Data

Apr. 20, 2005  (DE) .......................... 10 2005 018 396

(51) Int. Cl.
*G01P 21/00*  (2006.01)
(52) U.S. Cl.
USPC ......................................................... 73/1.34
(58) Field of Classification Search
None
See application file for complete search history.

(56) References Cited

U.S. PATENT DOCUMENTS

| 4,109,523 A | 8/1978 | Teyssandier |
| 4,300,401 A | 11/1981 | Pedersen |

(Continued)

FOREIGN PATENT DOCUMENTS

| DE | 44 30 223 A1 | 3/1995 |
| DE | 197 22 140 A1 | 12/1997 |

(Continued)

OTHER PUBLICATIONS

Brain et al., "Survey of pipeline flowmeters", Instrument Science and Technology, J. Phys. E: Sci. Instrum., vol. 15, 1982, pp. 967-1040.

*Primary Examiner* — Robert R Raevis
(74) *Attorney, Agent, or Firm* — Bacon & Thomas, PLLC

(57) ABSTRACT

A method for ascertaining volume- or mass-flow of a medium in a pipeline, or measuring tube, of radius (r) via a sound entrainment method, wherein ultrasonic measuring signals are transmitted and/or received along a plurality of defined sound paths (m). During a calibration phase, successive, different flow profiles (v(r)) of a measured medium are established in the pipeline, or in the measuring tube, and wherein, for each flow profile (v(r)), a defined volume flow, or a defined mass flow, is ascertained, wherein, on the basis of measured values $(v_x(r_1) \ldots v_x(r_m))$ ascertained in the separate measuring paths (m), each flow profile (v(r)) established in the pipeline, or in the measuring tube, is described by a characteristic parameter set $(a_1, \ldots, a_n$ with $n \in N)$ and wherein, for each flow profile (V(r)), on the basis of the defined volume- or mass-flow and on the basis of the measured volume- or mass-flow, a flow-profile-dependent correction factor $MF(a_1, \ldots, a_n)$ is calculated, and wherein, subsequently in measurement operation, a volume- or mass-flow ascertained via the parameter set $(a_1, \ldots, a_n$, with $n \in N)$ is corrected with the flow-profile-dependent correction factor $MF(a_1, \ldots, a_n)$ determined during the calibration phase.

4 Claims, 3 Drawing Sheets

(56) References Cited

U.S. PATENT DOCUMENTS

| | | |
|---|---|---|
| 5,987,997 A | 11/1999 | Roskam |
| 6,041,663 A * | 3/2000 | de Boer .................. 73/861.28 |
| 6,732,595 B2 | 5/2004 | Lynnworth |
| 6,837,113 B1 | 1/2005 | Freund |
| 2005/0055171 A1 | 3/2005 | Freund, Jr. |

FOREIGN PATENT DOCUMENTS

| | | |
|---|---|---|
| DE | 101 05 962 A1 | 4/2002 |
| DE | 101 07 292 A1 | 4/2002 |
| DE | 101 58 947 A1 | 6/2003 |
| DE | 103 294 A1 | 1/2005 |
| EP | 0 639 776 A1 | 2/1995 |

* cited by examiner

US 8,573,026 B2

METHOD FOR ASCERTAINING VOLUME—OR MASS—FLOW OF A MEDIUM

TECHNICAL FIELD

The invention relates to a method for determining volume- or mass-flow, e.g. volume- or mass-flow rate, of a medium in a pipeline, or in a measuring tube, via a sound entrainment method.

BACKGROUND DISCUSSION

From U.S. Pat. No. 3,940,985, an ultrasonic flow measuring device is known, in which volumetric flow rate of a medium flowing in a pipeline is measured radius-dependently. In this known solution, a plurality of pairs of ultrasonic sensors are arranged on the periphery of a measuring tube. These ultrasonic sensors deliver measurement data concerning flow velocity of the medium in different segments of the measuring tube. For ascertaining the volume flow of the medium through the pipeline, the measurement data from the individual measuring paths are integrated with suitable weighting.

From WO 97/19326, an ultrasonic flow measuring method is known, in which velocity of a medium flowing in a pipeline is ascertained along different measuring paths of an ultrasonic flow measuring device. In order to improve measurement accuracy, viscosity changes measurement are considered in the flow measurement. Changes in viscosity of a medium are caused by temperature changes, for example. In order to take such into consideration, it is proposed in WO 97/19326 to determine, by measuring the Reynolds number, a correction factor, with which the flow profile dependence of the flow measuring device can be compensated. For ascertaining the Reynolds number in WO 97/19326, the ratio of the flow velocities measured in the different measuring paths is used. In this known solution, a correction of the flow profile dependent measurement error is, thus, only possible, when, first, the Reynolds number is explicitly ascertained or measured. Such a method is relatively complex, both in the calibration phase and in the subsequent, measurement operation.

SUMMARY OF THE INVENTION

An object of the invention is to provide a cost-effective method for highly accurate ascertaining of volume- or mass-flow through a pipeline by means of a flow measuring device utilizing a plurality of measuring paths.

The object is achieved by the following features: That ultrasonic measuring signals are transmitted and/or received along a plurality of defined measuring paths of a pipeline, or measuring tube; that, in the pipeline, or measuring tube, successive, different, flow profiles of a measured medium are established; and that, for each flow profile, a defined volume flow, or a defined mass flow, is ascertained. Each flow profile established in the pipeline, or measuring tube, is described by a characteristic parameter set on the basis of measured values ascertained in the individual measuring paths. On the basis of the ascertained measured values in the individual measuring paths, a measured volume- or mass-flow is derived. Additionally, for each flow profile, on the basis of the defined volume- or mass-flow, and on the basis of the measured volume- or mass-flow, a flow profile dependent correction factor is calculated, with which, subsequently, in measurement operation, a volume- or mass-flow of the flow measuring device ascertained via the parameter set is corrected. The method of the invention rests, stated in basic terms, on an analytic description of the flow profile of the medium flowing through the pipeline.

Especially, it is provided that the flow profile ascertained on the basis of the measured values in the individual measuring paths is approximated by a function. In the simplest case, the flow profile is described by a polynomial. For example, a rotationally symmetric flow profile can be described by a function of the form $v(r)=(v_{max}, a_1, \ldots, a_n$ with $n \in \mathbb{N})$. Here, $v(r)$ is the flow velocity of the medium at a distance r from the longitudinal axis of the measuring tube, $v_{max}$ is the maximum flow velocity of the medium in the region of the longitudinal axis of the pipeline, and $a_1, \ldots, a_n$ are the parameters of a suitable fit-function describing the flow profile with sufficient accuracy. Basic forms, or ansätze, for suitable functions are available in the literature. For example, various ansätze are presented in the book of Gätke entitled "Akustische Strömungs- und Durchfluss-messung" ("Acoustical Flow-Measurements").

During the calibration phase, the velocities $v_x(r_1) \ldots v_x(r_m)$ in the flow paths are ascertained for each flow profile x, where m stands for the number of measuring paths. These measured velocities thus correspond to the velocities of the medium in the individual m segments of the pipeline, or measuring tube. On the basis of the m measured values, a fit-curve with the parameters $a_1, \ldots, a_n$ can be determined with the desired accuracy via an error balancing calculation, such as a least squares method. Successively, for each flow profile $v_x(r)$, a corresponding parameter set $a_1, \ldots, a_n$ is determined. Via a calibration with a second measuring device having a defined accuracy of measurement, a correction factor $MF(a_1, \ldots, a_n)$ is determined for each parameter set $a_1, \ldots, a_n$. Via this correction factor $MF(a_1, \ldots, a_n)$, it is possible to compensate the flow dependence of the flow measuring device. Of course, a sensible number of parameters $a_1, \ldots, a_n$ depends on the number of measuring paths available. In principle, it can be said that the function is a better description of the actual flow profile, the more measuring paths are available for measuring the flow velocity and thus for measuring the flow profile.

The invention will now be explained in greater detail on the basis of the drawing, the figures of which show as follows:

DETAILED DESCRIPTION

Figure 1:
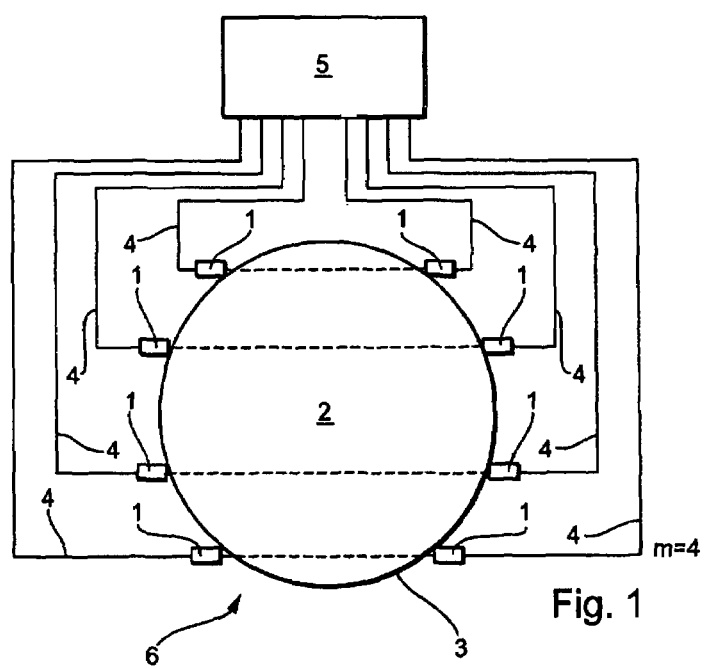
FIG. 1 is a schematic representation of an ultrasonic flow measuring device having four measuring paths.

FIG. 1 is a schematic drawing of an ultrasonic flow measuring device having four measuring paths; thus, m=4. Each of the m measuring paths is formed by two ultrasonic sensors 1. The measured values of the ultrasonic sensors 1 are forwarded via the connecting lines 4 to the control/evaluation unit 5. Control/evaluation unit 5 ascertains, on the basis of the travel-time difference of the ultrasonic measuring signals, in the flow direction of the medium 2, and counter to its flow direction, the volume- or mass-flow of the medium 2 through the pipeline 3. The ultrasonic sensors 1 are so arranged on the periphery of the measuring tube, or pipeline 3, that they provide information on the flow velocity $v(r_1) \ldots v(r_m)$ of the medium 2 as a function of distance r to the longitudinal axis of the measuring tube, or pipeline 3.

According to the invention, the measured values, delivered from the different measuring paths m and describing the flow profile of the medium 2 sufficiently accurately, are approximated by a fit-curve, which, in turn, is describable sufficiently accurately by a parameter set $a_1, \ldots, a_n$. In the case of a rotationally symmetric flow profile, the fit-curve has preferably the form $v(r)=(v_{max}, a_1, \ldots, a_n$ with $n \in N)$, wherein $v_{max}$ represents the flow velocity of the measured medium 2 in the region of the longitudinal axis.

Figure 2:
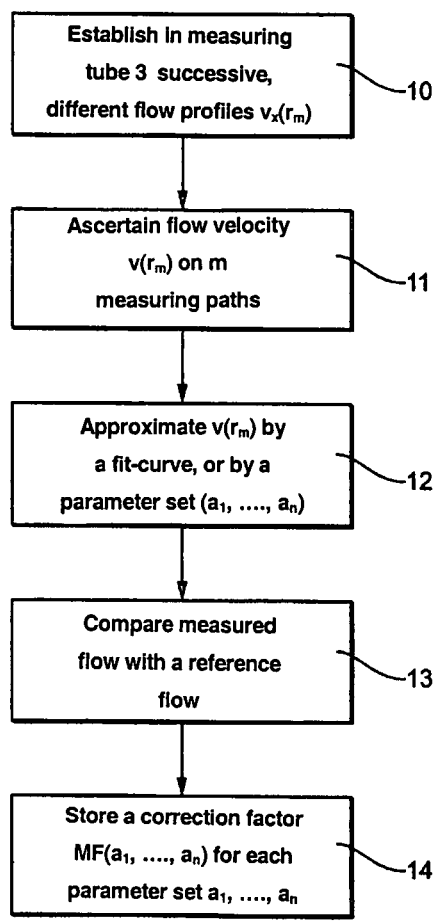
FIG. 2 is a flow diagram, which illustrates the individual steps during the calibration phase of the flow measuring device.

FIG. 2 presents a flow diagram, which illustrates the separate working steps during the calibration phase of the flow measuring device 6. Successively, different flow profiles $v_x(r)$ are established in the pipeline 3, or in the measuring tube— this is represented in point 10 of the flow diagram. Water, for example, is used as medium 2 for performing the calibration; however, it is also possible to perform the calibration with a medium 2 that will actually be measured in the pipeline 3, or in the measuring tube, in later measurement operation with the flow measuring device 6. A typical example, here, is petroleum. This limitation is, however, not a necessary characteristic of the method of the invention, since the essential advantage of the method of the invention is to be seen in the fact that it depends on the ascertaining of the flow of the medium 2, approximately, only on an as accurate as possible knowledge of the pertinent flow profile v(r).

By means of an ultrasonic flow measuring device 6 utilizing a plurality of measuring paths m, at block 11 of FIG. 2 the radius-dependent flow profile $v_x(r)$ is ascertained; at block 12 each flow profile $v_x(r)$ is described by a suitable fit-curve, or by a suitable parameter set. On the basis of the measured flow profile $v_x(r)$, the currently measured volume flow is ascertained.

Then, at program point 13, the volume flow ascertained by means of the plural-path flow measuring device 6 is compared with a reference volume flow of a reference flow measuring device. In the case of a difference between the measured volume flow and the volume flow defined via the calibration, a correction factor $MF(a_1, \ldots, a_n)$ for the corresponding flow profile v(r), or for the parameter set $a_1, \ldots, a_n$ describing the flow profile v(r) is determined and appropriately stored. This method step occurs at program point 14.

Figure 3:
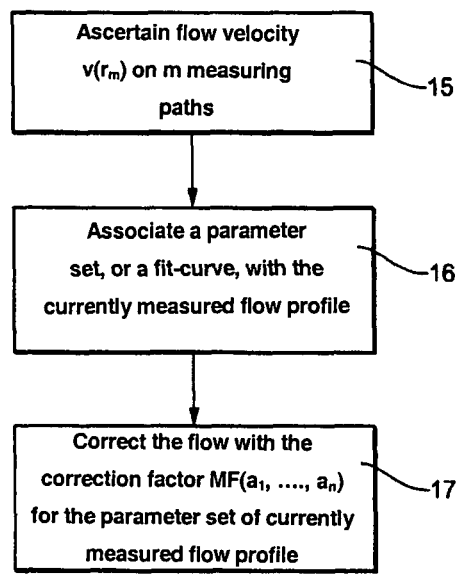
FIG. 3 is a flow diagram presenting the individual steps during the subsequent measuring phase of the flow measuring device.

FIG. 3 presents a flow diagram illustrating the separate working steps during subsequent measurement operation of the flow measuring device 6. The flow velocity of the medium 2 in the pipeline 3, or in the measuring tube, as the case may be, is ascertained in a plurality of measuring paths m as a function of radius r; see program point 15. The thus-won flow profile v(r) is, in program point 16, characterized by a fit-curve, which has, for example, the form $v(r)=(v_{max}, a_1, \ldots, a_n$ with $n \in N)$, or by a parameter set $a_1, \ldots, a_n$ describing the fit-curve. The parameter set $a_1, \ldots, a_n$ won during measurement operation is compared with the parameter sets $a_1, \ldots, a_n$ measured during calibration operation, and that parameter set $a_1, \ldots, a_n$ is selected, which has the best match. Correction of the measured volume flow then occurs at point 17, via the correction factor $MF(a_1, \ldots, a_n)$ associated with the parameter set $a_1, \ldots, a_n$.

The invention claimed is:

1. A sound entrainment method for ascertaining volume- or mass-flow of a medium in a pipeline, or measuring tube, of radius (r) comprising the steps of:
    transmitting and/or receiving ultrasonic measuring signals along a plurality of defined sound paths (m);
    establishing, during a calibration phase, successive, different flow profiles (v(r)) of a measured medium in the pipeline, or in the measuring tube;
    ascertaining for each flow profile (v(r)), a defined volume flow, or a defined mass flow;
    describing, on the basis of measured values $(v_x(r_1) \ldots v_x(r_m))$ ascertained in the separate measuring paths (m), each flow profile (v(r)) established in the pipeline, or in the measuring tube, by a characteristic parameter set $(a_1, \ldots, a_n$ with $n \in N)$;
    calculating, for each flow profile (V(r)), on the basis of the defined volume- or mass-flow and on the basis of the measured volume- or mass-flow, a flow-profile-dependent correction factor $MF(a_1, \ldots, a_n)$; and
    correcting, subsequently in measurement operation, a volume- or mass-flow ascertained via the parameter set $(a_1, \ldots, a_n$ with $n \in N)$ with the flow-profile-dependent correction factor $MF(a_1, \ldots, a_n)$ determined during the calibration phase, wherein
    during the calibration phase, the velocities $v_x(r_1) \ldots v_x(r_m)$ in the flow paths are ascertained for each flow profile x, where m stands for the number of measuring paths.
2. The method as claimed in claim 1, wherein:
    the flow profile (v(r)) ascertained on the basis of the measurement data in the separate measuring paths (m) is approximated by a suitable fit-function.
3. The method as claimed in claim 2, wherein:
    the flow profile (v(r)) is described by a polynomial.
4. The method as claimed in claim 2, wherein:
    a rotationally symmetric flow profile is described by a function of the form $v(r)=(v_{max}, a_1, \ldots, a_n$ with $n \in N)$.

* * * * *